United States Patent [11] 3,560,658

[72] Inventors Peter E. Molloy, Hazlet, N.J., by Elizabeth A. Molloy, executrix of said Peter E. Molloy, deceased; Edward C. Pienkowski, Westerville; James B. Shepard, Columbus, Ohio; Richard M. Swanson, Holmdel, N.J.

[21] Appl. No. 768,938
[22] Filed Oct. 18, 1968
[45] Patented Feb. 2, 1971
[73] Assignee Bell Telephone Laboratories, Incorporated Murray Hill, N.J. a corporation of New York

[54] TRUNK USAGE RECORDING AND CALL CHARGING EQUIPMENT

23 Claims, 6 Drawing Figs.

[52] U.S. Cl. .......... 179/7.1, 179/7
[51] Int. Cl. .......... H04m 15/18
[50] Field of Search .......... 179/7.1, 7.1TP, 7, 8.6

[56] References Cited

UNITED STATES PATENTS

| | | | |
|---|---|---|---|
| 3,105,115 | 9/1963 | Calloway .......... | 179/8 |
| 3,115,549 | 12/1963 | Lamneck et al. .......... | 179/8 |

*Primary Examiner*—Kathleen H. Claffy
*Assistant Examiner*—Jan S. Black
*Attorneys*—R. J. Guenther and James Warren Falk

ABSTRACT: Equipment is disclosed in a communication switching office for counting the number of trunk circuit usages in a trunk group and after a predetermined number are counted for causing a call data record to be made. Certain trunk circuits of the group are equipped to access call recording circuitry and are controlled by a trunk group sample circuit during the establishment of calls thereover to make the data records which pertain to calls made of the entire group. Circuitry is also provided for indicating the traffic usage rate, or average trunk circuit holding time, and for recording it each time a call usage record is made. The rate information together with the call usage data serves as a basis for charging a calling customer.

P. E. MOLLOY, DECEASED
ELIZABETH A. MOLLOY, EXECUTRIX
INVENTORS: E. C. PIENKOWSKI
J. B. SHEPARD
R. M. SWANSON
BY Frederick W. Padden
ATTORNEY

TABLE

| TOTAL COUNT | | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| OUTPUT OF TERMINAL I OF DESIGNATED FLIP-FLOP | ADD1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
| | ADD2 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 |
| | AC1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 |
| | AC2 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 |
| | AC3 | 0 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 0 |
| | AC4 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| MAKE CALL RECORD | | NO | | | | | | | | | | | | | | | | | YES | | | | | | | | | | | | | | | | | | | | | | | | | | | | | | | | NO |
| ALARM CONDITION | | YES ← | NO | | | | | | | | | | | | | | | | | | | | | | | | | | | | | | | | | | | | | | | | | | | | | | | | YES → |

TRUNK USAGE RECORDING AND CALL CHARGING EQUIPMENT

BACKGROUND OF THE INVENTION

This invention relates to equipment in a communication system for automatically making a call record each time a predetermined number of calls are established on a prescribed interoffice trunk group. It also relates to call charge circuitry for recording as part of each call record the traffic usage rate on the group.

As a result of demands by large commercial telephone customers for more modern, sophisticated communication services and for more reliable private network switching facilities, arrangements are now available which enable calls originated by these customers to be switched on a segregated basis via the general telephone network. Advantageously, existing call charging and billing equipment of the general network is potentially available to make call data records of both the segregated customer traffic as well as the usual office traffic.

To make such call records, special connecting circuitry is added in each trunk circuit serving the segregated traffic for gaining access to the office charging and billing equipment. The added circuitry has proven to be bulky addition to the existing customer trunk facilities and too costly to warrant extensive commercial use. Furthermore, the speed at which calls are processed in such an arrangement is diminished by the necessity to operate the access circuitry on every call. As a practical alternative, customers are furnishing their own independent call recording systems in lieu of utilizing the telephone company charging and billing equipment to make call records.

Therefore, a need exists for arrangement which overcomes the aforementioned deficiencies and also utilizes the existing office facilities to make call data records of the call switches on a segregated basis through general telephone network offices.

The telephone customer generating the segregated traffic is ordinarily charged for the shared use of the central office switching network and control equipment on a flat rate basis. Such a charge basis has been utilized because it has not been economically feasible to make customary call charge records on a per call basis. Accordingly, a need exists for facilities to charge customers for segregated calls established through general network equipment which is based on the actual call traffic rate, does not require a call record for each established call, and is equitable to the customer as well as the telephone company.

SUMMARY OF THE INVENTION

In accordance with the illustrative embodiment of this invention, records are made for each call on a trunk group for a segregated customer, but the call charging and billing equipment is not engaged during each call for making such records. Importantly, a plurality of calls are served and counted, and after a predetermined number thereof, the charging and billing equipment is connected to one trunk circuit for recording call data pertaining to all of the trunk circuits of the group. Illustratively, the call data is recorded by conventional automatic message accounting equipment (AMA) supplied by the telephone company in a central office and it advantageously serves both segregated customer call traffic and billable individual calls of other customers.

Advantageously, only one of the trunk circuits in the customer trunk group is illustratively equipped to access the office AMA equipment for cooperating with call traffic sampling equipment to make records pertaining to calls through all of the trunk circuits of the group. The sampling equipment counts the calls on the group and after a predetermined plurality of calls it directs one call record to be made. Oftentimes, the equipped trunk circuit is busy on a call connection, and it is not immediately available to make a call record when first requested by the sampling equipment. The latter stores the number of such call records to be made and as such records are completed via the equipped trunk circuit automatically subtracts from the stored total.

A salient aspect of this invention is that after a predetermined number of calls are established over a customer trunk group through which segregated traffic is routed, a charge record is made of the calling customer billing number and the traffic usage rate on the group. Such rate information pertains advantageously to the average holding time of calls over the group and enables a more accurate estimate to be made of the charges assessed against the customer as well as the adequacy of the group to handle the call traffic. The rate data is determined by a traffic usage rate indicator circuit which is connected to each trunk circuit of the group. At the time that a call record is made via a trunk circuit of the group, the sampling equipment operates a customer billing number circuit which sends over a separate path to the AMA equipment both the customer billing number and usage rate data. The customary AMA sorting equipment subsequently utilizes the data to prepare customer billing statements.

A feature of the invention is the provision of equipment for counting calls on a trunk group and for enabling one trunk circuit of the group thereafter to gain access to AMA recording equipment for recording call data for all calls made on all trunk circuits of the same group.

Another feature related to the immediately proceeding one is that the one trunk circuit gains such access only during the establishment of a call thereover following the accumulation of a predetermined number of calls over the trunk group.

Another feature is the provision of circuitry for storing the number of call records to be made in the event they cannot be made immediately by said one trunk circuit and also apparatus for subtracting from that number as each record is made.

A further feature is the provision of traffic usage rate indicator circuitry which connects to each trunk circuit of the group for determining the average trunk circuit holding time as well as the provision of apparatus for sending the information over a separate path to the AMA equipment each time a call record is made over the one trunk circuit.

BRIEF DESCRIPTION OF THE DRAWING

The foregoing and other structural aspects and advantages of this invention will be more clearly understood from a reading of the following description of an illustrative embodiment with reference to the drawing in which.

Figure 1:
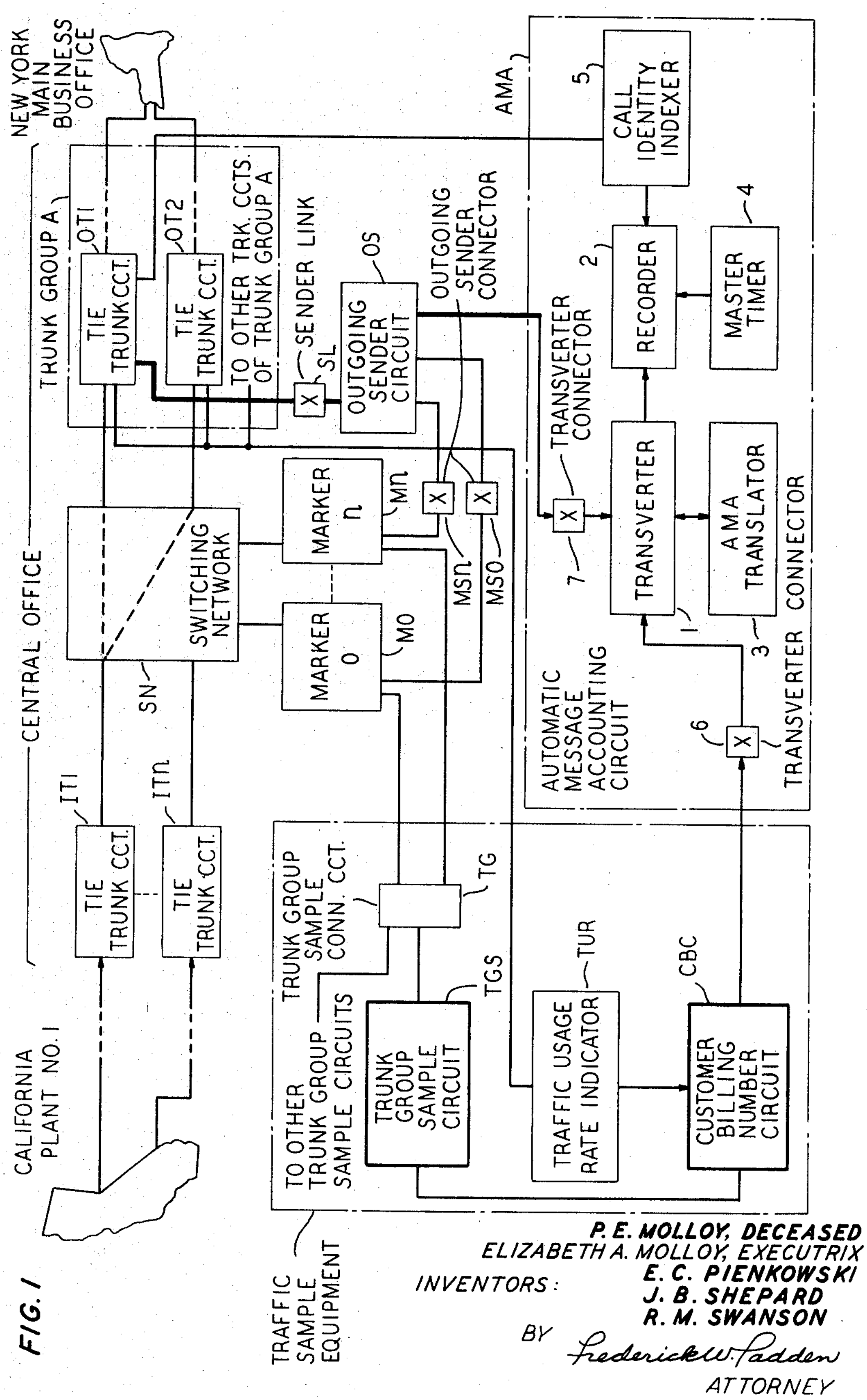
FIG. 1 depicts in block diagram form illustrative traffic sample equipment including a trunk group sample circuit TGS which cooperates with an automatic message accounting circuit AMA situated in a central office for making call data records.

In the drawing, relays are shown in detached form, i.e., the operative relay winding and its contacts are separated to facilitate the disclosure of the invention. Each relay winding designation consists of a number followed by a functional designation with the number indicating the FIG. on which the winding is shown. Contacts of a relay are designated the same as the operative winding and, in addition, include a dash followed by a suffix numeral to identify the particular contact.

The equipment of this invention principally comprises a trunk group sample circuit TGS, shown in heavy lined block in FIG. 1, which is connected via a trunk group sample connector circuit TG to marker circuits, MO—M*n*, of a switching office. Marker circuits, together with other common circuits are incorportated in an automatic telephone system to control the establishment of calls through a switching network SN. One such telephone system is disclosed in A. J. Busch U. S. Pat. No. 2,585,904 of Feb. 19, 1952. The invention described herein is illustratively embodied in a telephone system of the type disclosed in the Busch patent.

An important aspect of this invention is the periodic gathering and recording of traffic usage rate data for calls switched over outgoing trunk circuits. Equipment for gathering such rate data is disclosed, for example, in W. J. Lamneck et al. U. S. Pat. No. 3,115,549 of Dec. 24, 1963 and is shown in FIG. 1 in the lower left-hand corner.

Call records are periodically made under control of sample circuit TGS using the automatic message accounting circuit AMA of FIG. 1. Office message accounting facilities which function compatible with the illustrative embodiment are disclosed in H. D. Cahill et al. U. S. Pat. Nos. 2,599,358, and 2,727,092, respectively of Jun. 23, 1952 and Dec. 13, 1955 and in W. W. Carpenter et al. U. S. Pat. No. 2,688,658 of Sept. 7, 1954.

The drawing discloses only those details of the Busch, Lamneck et al., Cahill et al., and Carpenter et al. patents as are necessary to fully understand this invention. Accordingly, certain equipment units of those patents are not shown nor described in detail herein. Reference may be made to those patents for a more complete understanding of the construction and operation of such other equipment.

GENERAL DESCRIPTION

Referring now to FIG. 1, calls originated at a California plant No. 1 destined for a New York main business office are established via tie trunk circuits IT1—IT*n*, and extended on a segregated basis under control of the central office control circuits over switching network SN and trunk circuits of trunk group A. The circuits of group A are used exclusively for this traffic and all other office call traffic is screened by markers MO—M*n* and connected in a conventional manner via different paths of network SN and over different trunk circuits.

According to this invention, traffic sample equipment situated in the office controls the making of call data records pertaining to all calls switched on the trunk circuits of trunk group A utilizing, advantageously, one of the trunk circuits, OT1, to gain access to automatic message accounting circuit AMA. Such access advantageously requires no modification of existing prior art circuitry and includes a path, indicated by heavy line, from circuit OT1 through sender link SL, and outgoing sender circuit OS to circuit AMA. In accordance with a salient aspect of the invention, trunk group sample circuit TGS directs the making of records for charging and billing the segregated customer after a predetermined number of calls are established over trunk group A.

To establish a background for the following discussion of the invention, a call connection is now briefly described from the California plant via the central office to the main business office in New York. Assume that a call request is originated at the California plant from one of the local stations (not shown) and then the address code of the central office is dialed. As a result, a call connection is established from the local station over tie trunk circuit IT1, for example, to the central office. Upon the receipt of the dial tone signal from the office, the originator dials the address code of the main office in New York. As disclosed in the Busch patent tie trunk circuit IT1 is thereafter connected via an idle one of the network paths of network SN indicated by dashed lines to either tie trunk circuit OT1 or OT2.

Returning now to the discussion of the invention, apparatus of circuit TGS counts each call established on trunk group A and after a predetermined number of such calls is counted it sends a signal to the office common control circuits to request that a call record be made. Specifically, each time a call is processed by marker MO, for example, on trunk group A, marker MO operates a trunk group sample connector circuit TG and requests over a path established through circuit TG that sample circuit TGS indicate whether or not a call record is required on this connection. If no call record is required, marker MO returns an add signal to circuit TGS for indicating the establishment of one more call over group A. This signal is received at circuit TGS and increments a counter. When circuit TGS indicates that a call record is required, marker MO connects to the trunk circuit of group A which is randomly selected by the marker in a customary manner to serve the outgoing call. The selected circuit then sends to the marker a signal which indicates whether or not it is circuit OT1. Assuming circuit OT1 is selected and a call record to be made, marker MO controls the establishment of the access path between circuit OT1 and circuit AMA over which data to be recorded is sent and also returns a subtract signal to circuit TGS. The subtract signal causes a fixed number to be deducted from the accumulated count in a circuit TGS counter. If, on the other hand, the marker circuitry determines that circuit OT2 is selected, for example, an add signal is returned to circuit TGS indicating no record is to be made on this call.

The traffic sample equipment also includes traffic usage rate indicator TUR and customer billing number circuit CBC which cooperate to determine continuously the average holding time for calls on group A and to control the recording of this information in circuit AMA each time a record is made via circuit OT1. Indicator TUR is connected to the trunk circuits of group A for determining individual circuit holding times which are averaged and sent to circuit CBC. It will be recalled that each time a record is made via circuit OT1 is subtract signal is received at circuit TGS. In response thereto the latter sends a signal to circuit CBC and, in turn, it requests a connection to recorder 2 of circuit AMA via transverter connector 6 and transverter 1. Circuit CBC sends over that connection the average trunk holding time received from indicator TUR and also a customer billing number which is used subsequently to locate the recorded data for preparing customer billing statements. Importantly, the aforementioned equipment enables segregated calls to be charged not on a flat rate basis but on a basis which approximates to a high degree the actual customer use of the office equipment.

DETAILED DESCRIPTION

Figure 3:
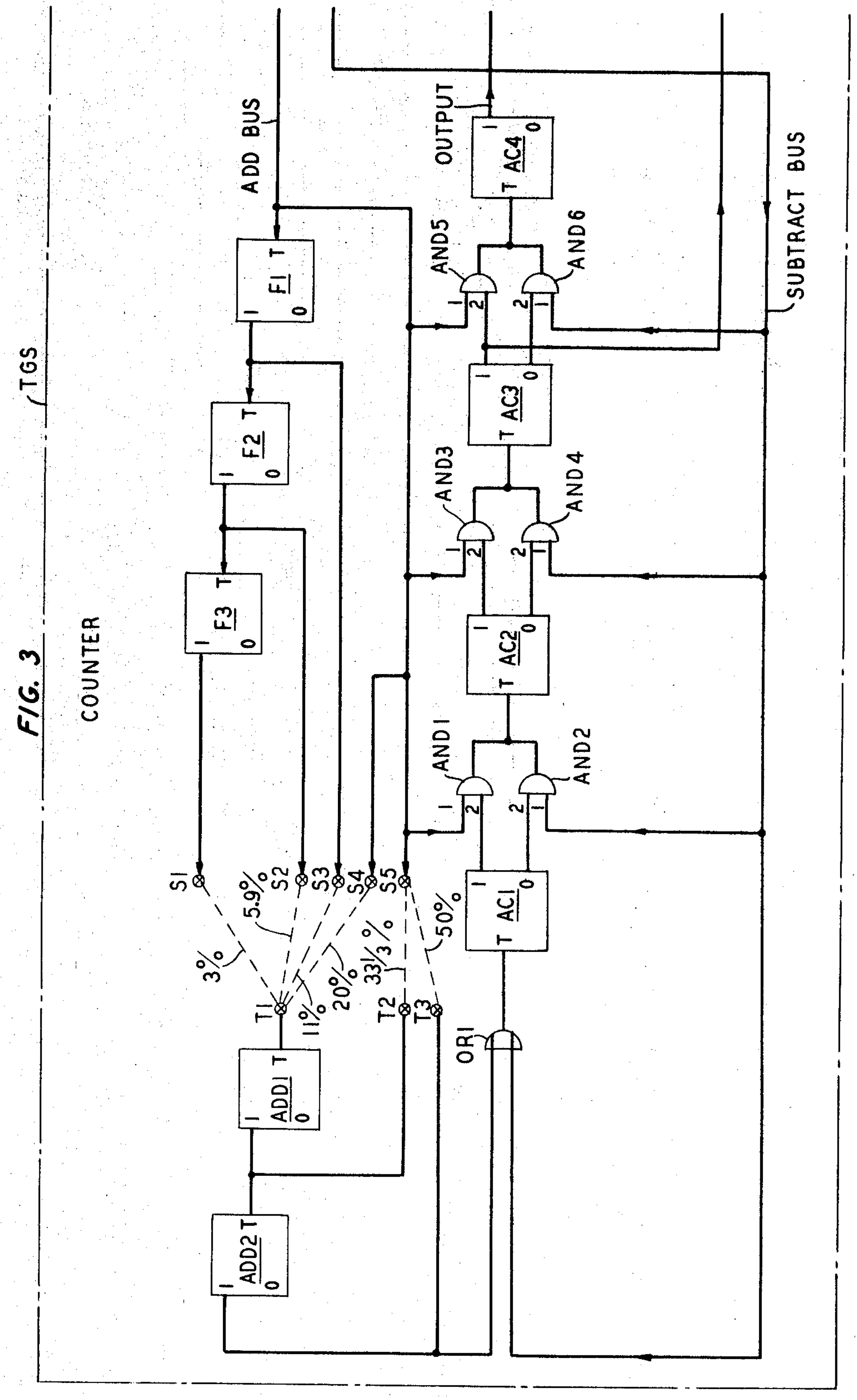
FIG. 3 depicts the add and subtract counters of the trunk group sample circuit TGS.
Figure 4:
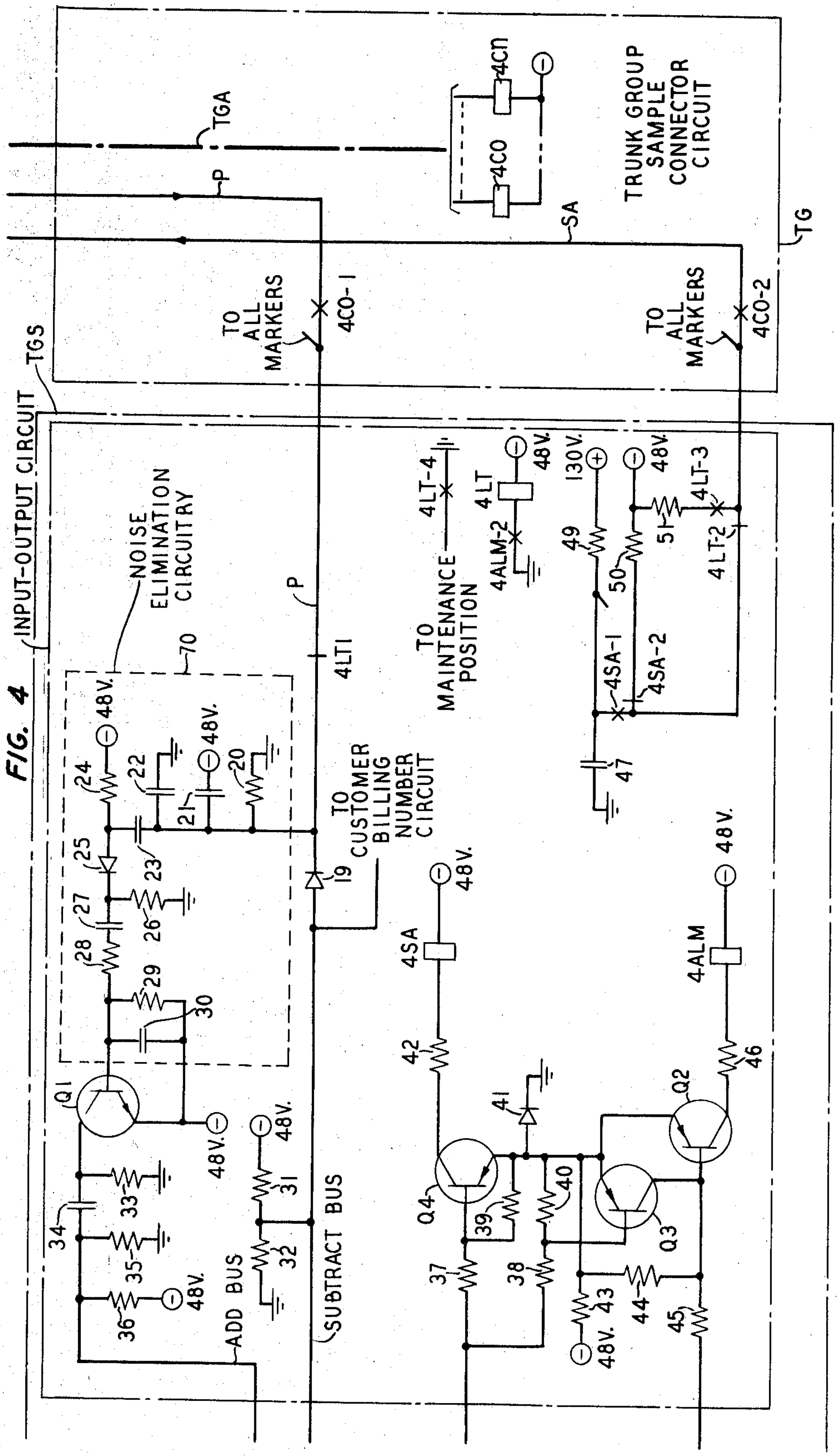
FIG. 4 sets forth a control circuit portion of the trunk group sample circuit TGS and the trunk group sample connector circuit TG.

Reference will now also be made to FIGS. 2 through 5 in order to describe in detail the invention as portrayed in the illustrative embodiment. In order to facilitate the presentation of the detailed disclosure, the following description is subdivided as follows:

I Office Common Control Circuit Operations;
II Counting Calls on Trunk Group A;
III Counter Circuit Operation (FIGS. 3 and 4);
IV Alarm Conditions; and
V Making Charge Records.

I OFFICE COMMON CONTROL CIRCUIT OPERATIONS

Figure 2:
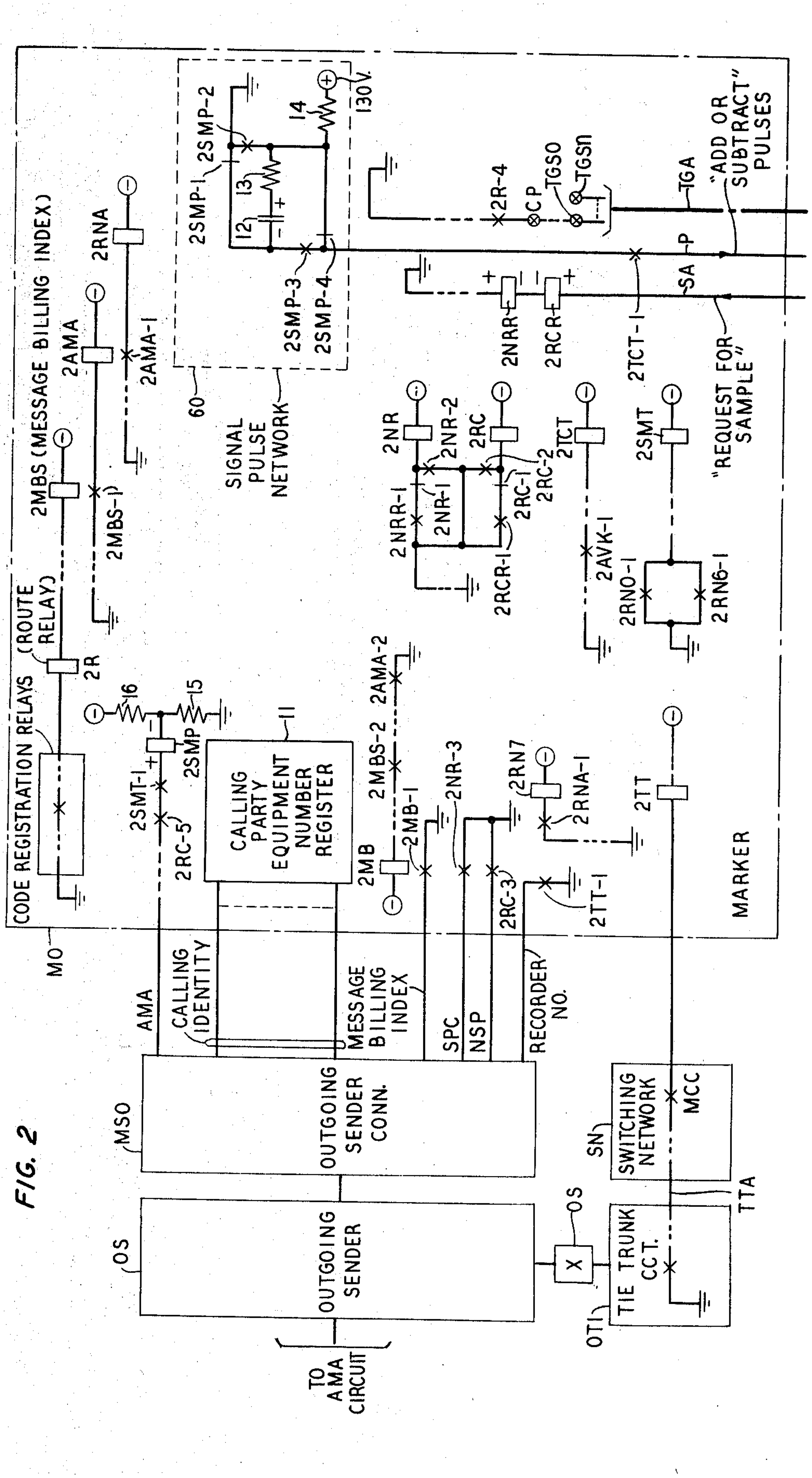
FIG. 2 sets forth pertinent portions of the office common control circuits.

After the registration of the customer-dialed digits a connection is established between a register of network SN and marker MO as disclosed in Busch beginning in column 89 under the heading "Setting Up Terminating End of Connection." In a customary manner, the dialed address code as well as a so-called equipment number of the calling trunk circuit termination are sent to marker MO for temporary storage by its code registration relays and the calling party equipment number register 11 of FIG. 2, respectively, and for directing the establishment of the terminating connection.

Specifically, the called address code controls the operation of a particular route relay of marker MO, such as relay 2R shown at the top of FIG. 2. The latter is operated over a path from ground, via contacts of code registration relays operated by the called address code, the windings of relays 2R and 2MBS and other contacts not shown but symbolically indicated by a dashed line to battery. Operated contacts of route relay 2R close a plurality of marker circuit paths over which the following customary functions are performed:

a. selection of sender OS (FIG. 2) and operation of outgoing sender connector MSO (column 108 of Busch);
b. selection of trunk circuit OT1 (FIG. 2) to the destination office and operation of link SL to connect it to sender OS (column 110 of Busch); and
c. transfer of accounting information and other charge data to sender OS (column 121 of Busch).

The data transferred to sender OS which, in accordance with the invention, is periodically recorded under control of circuit TGS, includes the equipment number, a billing index, and a number of a recorder in circuit AMA of FIG. 1 containing a tape on which the call data is to be recorded. The equipment number consists of a series of numbers, or digits, specifying the calling line switch position in terms of its line link frame, vertical group, horizontal group, and vertical file. With reference to the left-hand side of FIG. 2, the equipment number is stored in calling party equipment number register 11 and transmitted over the leads designated "calling identity" via connector MSO to sender OS.

The message billing index, per se, is not important to an understanding of the invention, but the operation of certain of the marker relays which generate the index is. Accordingly, a brief description of the marker circuitry for generating this index is included. The billing index is determined by relay 2MBS which operates in series with relay 2R. Relay 2AMA is, in turn, operated over an obvious path by contact 2MBS–1. Thereafter, operated contact 2AMA–1 closes a path for operating relay 2RNA. Referring to the left of center of illustrated marker MO, relay 2MB is next operated for transmitting the billing index to sender OS via the lead designated "message billing index" and connector MSO. It is noted that Busch discloses a plurality of message billing relays (2MB) each for providing a separate and unique billing index indication. A single relay 2MB is shown in the illustrative embodiment and it is operated from ground via contacts 2AMA–2 and 2MBS–2 and the winding of relay 2MB to battery. Operated contact 2MB–1 connects ground to the lead designated "message billing index" to generate the index indication.

The recorder number identifies one of plurality of recorders of circuit AMA, such as recorder 2 shown in FIG. 1. It includes a tape perforator and recording tape upon which the call data transmitted thereto in a customary manner by office sender OS is recorded during the establishment of an interoffice connection on circuit OT1. Specifically, referring to the lower left corner of FIG. 2, circuit OT1 connects ground to lead TTA which is coupled by contact MCC of network SN to marker MO wherein relay 2TT is operated. As shown in Busch, a plurality of such relays are ordinarily furnished, one for each office recorder, however, for convenience, a single relay 2TT is shown in this embodiment. Operated contact 2IT–1 grounds the lead designated "Recorder No." to send the recorder number to sender OS via connector MSO.

In accordance with a salient aspect of this invention, circuitry is added to markers MO—M*n*, controlling the sending of an additional signal to sender OS during the interoffice connection to indicate whether or not a call record is required. This circuitry is controlled, advantageously, by trunk group sample circuit TGS details of which are disclosed in FIGS. 3 and 4. During the connection, an operated route relay contact closes a marker circuit path for actuating the trunk group sample connector circuit TG which, in turn, connects marker MO to sample circuit TGS. The latter sends a signal to marker MO based upon the number of calls previously counted on trunk group A which signal indicates whether or not a call record is needed. Specifically, with reference to the right-hand side of FIG. 2, the operation of relays 2NRR and 2RCR respectively indicate two functions—no record required and record required. Relay 2NRR is operated by circuit TGS when –48-volt resistance battery is applied to lead SA and, alternatively, relay 2RCR is operated by circuit TGS when +130-volt resistance battery is applied to the same lead. Relay 2NRR operates relay 2NR and relay 2RCR operates relay 2RC. A path for operating relay 2NR may be traced from its winding through contacts 2NR–1 and 2NRR–1 and various other contacts not shown to ground, Similarly, the operating path for relay 2RC may be followed from its winding through contacts 2RC–1 and 2RCR–1 and various contacts not shown to ground. The contacts not shown in the aforementioned operating path are of marker relays which function primarily to release the operated relay 2NR or 2RC at the end of the marker operating cycle. A lockup path is furnished for operated relays 2NR and 2RC by respective contacts 2NR–2 and 2RC–2. Referring now to the left side of FIG. 2, lead SPC or lead NSP is grounded respectively by the operation of relays 2NR or 2RC. Specifically, contact 2NR–3 grounds lead SPC to signal sender OS via connector MSO that no record is required. Contact 2RC–3 grounds lead NSP to indicate the need for a call record. In addition, the signal on lead NSP also indicates that a special mark known as a "sample mark" is required as part of the a AMA record so that these records may be facilely separated from conventional AMA records.

II COUNTING CALLS ON TRUNK GROUP A

Calls over trunk group A are counted by sample circuit TGS and after a predetermined number are counted, a signal is sent to markers MO—M*n*during subsequently processed calls on group A for indicating that a call record is needed until the requested record is made. An important feature of circuit TGS is that it keeps a count of the total number of call records to be made in the event records cannot be made as fast as they are requested. Each time a record is made the marker MO—M*n* the call sends a subtract signal to circuit TGS which subtracts one record from the total count.

As stated previously, circuit TGS is connected to marker MO by trunk group sample connector circuit TG (details of which are shown to the right side of FIG. 4) during the establishment of connections on trunk group A. The circuitry for effecting this connection is shown at the right-hand side of FIG. 2 and includes contact 2R–4 which connects ground via other relay contacts not shown to cross connect terminal CP. The latter is cross connected illustratively to terminal TGSO for operating connector relay 4CO of connector circuit TG via a lead of cable TGA. The remaining connector relays (4C1-—4C*n*) are operated in a similar manner for connecting marker MO to other sample circuits. In the illustrative embodiment, a single circuit TGS is depicted to demonstrate the manner of operating with a single trunk group A.

The operation of relay 4CO closes two leads at contacts 4CO–1 and 4CO–2 between marker MO and circuit TGS over which signals are sent indicating whether or not a call record is required and also for indicating whether or not the requested call record has been made. In particular, circuit TGS sends signals to marker MO via lead SA and receives responsive signals from marker MO on lead P. As discussed hereinbefore, if no record is to be made circuit TGS connects –48 volts to lead SA to operate relay NRR of marker MO which, in turn, sends an appropriate signal to sender OS. The path in FIG. 4 for applying this potential to lead SA can be traced from contact 4CO–2 via contacts 4LT–2 and 4SA–2 and resistor 50 to battery. In the event a call record is required, relay 4SA of circuit TGS is operated as will hereinafter be described to connect +130 volts to leads SA to operate marker relay 2RCR. In FIG. 4, this path may be traced from contact 4CO–2 via contacts 4LT–2 and 4SA–1 and resistor 49 to +130 volts.

Let us assume that circuit TGS applies a –48 volt to lead SA indicating to marker MO that no record is required. Marker MO processes the call connection in a customary manner and near the end of its operating cycle marker relay contact 2AVK–1 is operated for operating relay 2TCT which is depicted at the lower center of FIG. 2. Moving to the right, contact 2TCT–1 connects a capacitor 12 of signal pulse network 60 which is charged to +130 volts to lead P for sending a pulse signal, add signal, to circuit TGS for incrementing its counter. Capacitor 12 is normally charged in the direction indicated in the FIG. and a path to discharge it and also switch transistor Q1 of FIG. 4 may be traced from ground in network 60 via contact 2SMP–1, capacitor 12, resistor 13, contacts 2SMP–4 and 2TCT–1, lead P, contacts 4CO–1 and 4LT–1, and noise elimination circuitry 70 to turn on transistor Q1. As will subsequently be discussed, transistor Q1 thereafter generates a pulse which operates the counter of FIG. 3.

Let us assume a different set of circumstances, namely, that circuit TGS indicates by applying +130 volts to lead SA that a record is needed. In addition, assume that trunk circuit OT2 is selected by marker MO to serve the call and therefore no call record can be made. In accordance with an important feature of the invention the recorder number sent by circuit OT2 to marker MO indicates that it is not equipped to access circuit a AMA. As disclosed in FIG. 151 of Busch there may be as many as eight recorders, 0–7, any one of which may be assigned to trunk circuit OT2, to record customary call data. In the illustrative embodiment recorder number 7 does not indicate a particular assigned recorder but instead it provides an indication that circuit OT2 is not equipped to access circuit AMA. Referring now to the left-hand side of FIG. 2, relay 2RN–7, corresponding to recorder 7, operates over a path from ground via marker MO relay contacts (see FIG. 151 of Busch), contact 2RNA–1 and the winding of relay 2RN–7 to battery. No further marker circuit action occurs until the end of the marker cycle at which time contact 2AVK–1 is operated and, as hereinbefore discussed, relay 2TCT operates to send a +130-volt pulse, add pulse, over lead P to circuit TGS for incrementing its counter.

If, in the previous example, the recorder number of the selected trunk circuit is not 7 but is a number between 0—6 inclusive, marker MO sends a −130-volt signal, subtract pulse, on lead P to circuit TGS to indicate that ta call record can be made. Specifically, as shown at the bottom of FIG. 2 relay 2SMT is operated by an operated one of the marker circuit contacts 2RNO–1 to 2RN6–1 which respectively operate when the trunk circuit recorder number is between 0 and 6. The operating circuit of relay 2SMT can be traced from ground through an operated one of relay contacts 2RNO–1 through 2RN6–1 and the winding of relay 2SMT to battery. Referring now to the upper left-hand corner of FIG. 2, contacts 2SMT–1 and 2RC–5 connect the winding side of relay 2SMP indicated as positive via lead AMA and connector MSO to sender OS. The negative side of the winding is connected to a voltage divider composed of resistors 15 and 16 which establish a voltage of approximately −3.5 volts at the winding terminal. A relay of sender OS (not shown) is connected to lead AMA and it operates for requesting a connection between sender OS and circuit AMA. Relay 2SMP remains nonoperated due to its winding polarization. When a locking ground is applied in sender OS to hold the sender relay operated that ground is returned over lead AMA and it operates relay 2SMP.

Your attention is next directed to signal pulse network 60. Operated contacts 2SMP–2 and 2SMP–3 respectively ground one side of resistor 13 and connect charged capacitor 12 via contact 2TCT–1 to lead P. Upon the operation of relay 2TCT at the end of the marker cycle, capacitor 12 discharges generating a negative pulse on lead P which may be traced to FIG. 4 and therein via contacts 4CO–1, 4LT–1 and diode 19 to actuate the counter of circuit TGS for subtracting a fixed count from the accumulated counter total. It is noted that the generated negative pulse is blocked by diode 25 of noise elimination circuitry 70 to prevent turning on transistor Q1.

III COUNTER CIRCUIT OPERATION (FIGS. 3 AND 4)

The add and subtract pulses sent on lead P by marker MO are recorded by serially connected bistable flip-flops F1—F3, ADD1, ADD2, and AC1 to AC4 which constitute a combined add and subtract counter. The counter totals the received add pulses and subtracts a fixed number from that total as subtract pulses are received. When the accumulated count exceeds a predetermined count, flip-flop AC4 sends a high signal on the lead designated "output" for indicating the necessity for a call record.

The input-output circuit of FIG. 4 contains noise elimination circuitry 70 that is connected to lead P for shunting low frequency noise spikes to ground. Details of its operation are discussed hereinafter. Transistor Q1 connects to circuitry 70 and it inverts the positive add pulse signals received on lead P and coupled by circuitry 70 into negative pulses for coupling to an add bus labeled in FIG. 3. The output portion comprises relays 4SA and 4ALM as well as transistors Q2—Q4 which are connected to flip-flop stage, AC4, of the counter and constitute a buffer stage for minimizing the output loading on the counter. The operation of relay 4SA indicates that a call record is required. The operation of relay 4ALM indicates a trouble condition such as for example the receipt of add pulses exceeding the counter capacity.

Before discussing the operation of the counter in greater detail, some preliminary comments are in order. The flip-flops utilized in the counter (FIG. 3) may be of any well-known type capable of being triggered on a single lead to change from one stable state to another. An example of such a device containing two transistors is disclosed in Joseph A. Walston and John R. Miller, "Transistor Circuit Design" (McGraw-Hill, New York, 1963), page 373 et seq. The drawing convention chosen for describing the flip-flop herein is a rectangle with its designation underlined and having three terminals indicated as T, O and 1. The device is switched, or triggered, by a negative-going pulse applied to terminal T which pulse turns off and on, or conducting, transistor of the device thus allowing a second transistor of the device to turn on. The following chart describes the states of terminals O and 1 in terms of an arbitrary convention which is used hereinafter to describe the counter operation.

| | States | |
|---|---|---|
| | Zero output | One output |
| Terminal 0 | Low negative voltage | High negative voltage |
| Terminal 1 | High negative voltage | Low negative voltage. |

To demonstrate the use of this convention, an example is presented with reference to flip-flops F1 and F2 of FIG. 3. Assume that terminal 1 of flip-flop F1 has a one output, or low negative voltage. A negative pulse on terminal T causes the state of terminal 1 to switch from the one output to a zero output for generating a negative pulse which is coupled to terminal T of flip-flop F2. In turn, the latter is triggered and its respective terminals 0 and 1 change state. It is to be noted that the transition from a zero output to a one output does not generate a negative pulse.

Two other logic conventions are also employed in the counter. One is an OR gate such as the device labeled OR1 and the other is an AND gate labeled by the term AND followed by a number. The OR gate is triggered by a negative pulse received on either input lead and in turn generates a negative pulse on its output lead. The AND gate is triggered by coincidently applied negative pulses on all input leads for generating a negative output pulse.

An important aspect of the invention is that the sampling rate at which call records are made is adjustable in five steps from 3 percent to 50 percent. With reference to FIG. 3, if for example it is desired to make one record for every two or three calls, i.e., at a 50 percent or 33 ⅓percent rate, than terminal S5 is cross connected to respective terminals T3 or T2. For lower sampling rates, prescribed ones of terminals S1 to S4 are connected to terminal T1 to obtain respective rates of 3 percent, 5.9 percent, 11 percent and 20 percent. The effective sampling rate is varied by the insertion of stages of flip-flops, F1, F2, F3, ADD1, and ADD2 between the add bus and terminal T1—T3. At the lower sampling rates each inserted stage decreases the sample rate approximately by one-half.

Figures 5, 6:
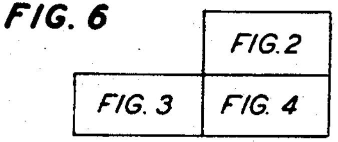
FIG. 5 is a table depicting the operative states of counter TGS logic circuits.
FIG. 6 shows the cooperative arrangement of FIGS. 2 to 4.

The table of FIG. 5 discloses the state of each counter flip-flop for total counts anywhere from −12 to +37 at a 20 percent sampling rate. The following specific example utilizing the table is offered to illustrate the counter operation. Assume the total registered count is four and with reference to the table, it shows that the terminal 1 output of all flip-flop stages is one, or low negative voltage. The next add pulse raises the total count to five and changes the output state of every flip-flop from one to zero as may be seen in table A.

As previously discussed, each add pulse on lead P turns on transistor Q1 and, as a result, negative −48 volts is connected to the collector of transistor Q1 and also to a differentiating network composed of resistors 33 and 35 and capacitor 34 for generating a negative pulse on the add bus. In FIG. 3, the pulse is coupled by the cross connect wiring from terminal S4 to terminal T1 (20 percent sample wiring) and triggers flip-flop ADD1. Terminal 1 of the latter device changes from a one output to a zero output generating a negative pulse at terminal T of flip-flop ADD2 for triggering it. In turn, a negative pulse is generated by flip-flop ADD2 on terminal 1 for triggering flip-flop AC1 via gate OR1.

Terminal 1 of each one of flip-flops AC1 to AC3 is connected to terminal 2 of respective gates AND1, AND3, AND5. Also, the add pulse is coupled to the other terminal, terminal 1, of each of those gates. When an add pulse on terminal 1 and a negative pulse on terminal 2 are coincident, the gate itself generates a negative pulse which is coupled to terminal T of a succeeding flip-flop stage. In the present illustrative example flip-flops AC1 to AC4 are triggered in serial order. This type of counter operation is ordinarily referred to as "ripple-through" because succeeding stages are triggered in order by preceding stages. It is to be noted that the add pulse is of sufficient duration to permit all stages to be consecutively switched.

Specifically, the negative pulse on terminal 1 of flip-flop AC1, which pulse is generated when it is triggered by the pulse from gate OR1, switches gate AND1 and, in turn, flip-flop AC2 is switched. This action is repeated through gate AND3, switching flip-flop AC3, and through gate AND5 switching flip-flop AC4. When flip-flop AC4 switches, the voltage on lead "output" connected to its terminal 1 is switched from a low-to-high negative voltage to turn on transistor Q4 which causes the operation of relay 4SA. The operating path of relay 4SA may be traced from the winding of relay 4SA, resistor 42, the collector-emitter junction of transistor Q4 and diode 41 to ground. Resistors 37, 38, 39 and 40 furnish the customary bias for transistor Q4. Transistor Q3 is also turned on as a result of the voltage drop across resistor 40 for clamping transistor Q2 off. The importance of the operation of transistors Q2 and Q3 is discussed under the heading "Alarm Conditions."

A negative pulse on the subtract bus causes the total count in the counter to be reduced, or decremented, by a prescribed count which depends upon the sampling rate. The following table shows the exact count reduction for various rates.

| Sampling rate, percent: | Count reduction |
|---|---|
| 50 | 1 |
| 33⅓ | 2 |
| 20 | 4 |
| 11.1 | 8 |
| 5.9 | 16 |
| 3 | 32 |

Each subtract pulse recycles the counter by triggering flip-flop AC1 and, dependent upon the existing state of flip-flops AC1 to AC4, succeeding flip-flop stages. For the sampling rate of 20 percent, the table may be facilely used to determine the states of the various counter flip-flops after the receipt of a subtract pulse by subtracting a count of four from the total count for each received subtract pulse. The count factor of flip-flop AC1, i.e., the multiplier factor of that counter stage, determines the count reduction. For example, on a 3 percent sample it takes 32 add pulses to switch flip-flop AC1. This obtains because flip-flops F1, F2, F3, ADD1 and ADD2 must be triggered in serial order and that requires 32 pulses on terminal T of flip-flop F1 to obtain one pulse out of terminal 1 of ADD2. Thus, when arranged for a 3 percent sample, the switching of flip-flop AC1 by a subtract pulse reduces the total count by a factor of 32. Since subtract pulses are generated during calls the actual value of a subtract pulse is the multiplier factor of stage AC1 plus one.

Taking a specific example to further illustrate the counter operation in response to a subtract pulse, assume the total count is at five and the sampling rate is 20 percent. The table shows that terminal 1 of all flip-flops has zero outputs. Upon the receipt of a subtract pulse the count of four is subtracted from the total count leaving a remainder total count of one and also flip-flops AC1 to AC4 changed to a one output. The states of flip-flops ADD1 and ADD2 remain unchanged.

Specifically, with reference to FIGS. 3 and 4, the marker generates the subtract pulse, a negative pulse, which is sent along lead P and may be traced in FIG. 4 through contacts 4CO–1 and 4LT–1, diode 19 to the subtract bus. Resistors 31 and 32 furnish a low impedance termination for the bus as well as a fixed voltage level or resting level. The negative signal may be traced to terminal 1 of gates AND2, AND4 and AND6 for enabling the gates. The bus is also connected to gate OR1 and the latter upon the receipt of the subtract signal transmits a trigger signal to flip-flop AC1 for switching its state. As described hereinbefore a switching signal ripples through the counterstages switching them and causing terminal 1 of each stage to switch from a one output to a zero output. It is noted that the state of the zero terminals of flip-flops AC1 to AC4 are opposite that of their respective terminal 1 and when switched from one to zero output negative pulses are generated which trigger succeeding AND gates and succeeding flip-flop stages. When terminal 1 of flip-flop AC4 is switched a one output on lead "output" turns off transistor Q4 and in turn relay 4SA releases. As described hereinbefore, the release of relay 4SA indicates no call records are required.

Turning next to the noise elimination circuitry 70, of FIG. 4, it comprises resistors 20 and 24 which terminate the line as well as furnish a back bias voltage for diode 25. Capacitors 21, 22 and 30 shunt high frequency noise to AC ground. Capacitor 23 isolates diode 25 from lead P allowing the anode of diode 25 to remain at −48 volts. Resistor 26 and capacitor 27 maintain the cathode of diode 25 at ground potential. Resistors 28 and 29 function respectively to limit the base current of transistor Q1 as well as to prevent falsely sustaining it in the on condition.

IV ALARM CONDITIONS

If the total count exceeds a prescribed maximum total count, it is an indication that the number of requests for call records is increasing at a faster rate than call records are actually being made. This condition may occur when too few of the trunk circuits of group A are equipped to access circuit AMA for making the required records. Advantageously, the counter automatically detects this condition, withdraws its request for call records and causes an alarm to be registered for summoning the assistance of maintenance personnel.

Specifically, with reference to the table of FIG. 5, when the total count exceeds 36, an alarm condition results. The 37 add pulse causes the output of terminal 1 of flip-flop AC4 to switch from zero to one and the output at terminal 1 of flip-flop AC3 to switch from one to zero. The output of flip-flop AC4 turns transistor Q3 off allowing transistor Q2 to turn on from the output of flip-flop AC3 operating relay 4ALM. Diode 41 is a Zener diode which draws current through resistor 43 and establishes at the emitter junction of transistor Q3 a reference voltage level that is more negative than the output of flip-flop AC4. Thus the voltage drop across resistor 40 back biases the base-emitter junction of the transistor Q3 and it turns off The path for turning on transistor Q2 may be traced from terminal 1 of flip-flop AC3 through resistor 45, the base-emitter junction of transistor Q2 and diode 41 to ground. The emitter-collector current of transistor Q2 operates relay 4ALM and it, in turn, operates relay 4LT over an obvious path from ground through contact 4ALM-1 and the winding of relay 4LT to battery. Referring now to the lower right-hand corner of FIG. 4, operated contact 4LT-3 connects battery via resistor 51 to lead SA for indicating that no records are required. Lead P is opened by contact 4LT-1 to prevent subsequently transmitted add or subtract pulses thereon from operating the counter. As shown directly above the winding of relay 4LT, operated contact 4LT-4 connects ground to a maintenance position for alerting maintenance personnel.

In the event the total count exceeds a predetermined negative count that is an indication that a number of call records have already been made for calls which have not actually been established over group A. This condition is not per se a trouble condition, but becomes one when the negative count is too large. The operating speed of circuit TGS is relatively much faster than the speed at which markers MO—Mnfunction and therefore no preference circuitry is furnished or needed in connector circuit TG. Accordingly, markers have simultaneous access to circuit TGS and on occasion more than one marker may receive simultaneously a request for a call record resulting in one or more records being made than are actually required. The counter advantageously counts these records and records a total count less than zero so that the extra records represent calls as yet unmade.

Taking a specific example, as shown in the table, when the total count exceeds −11 an alarm condition results. The next subtract pulse triggers flip-flop AC3 and the output of its terminal 1 switches from a one to a zero. Since the output of AC4 is one at this time the counterstate is precisely the same as hereinbefore described for the 37 pulse and relay 4ALM is operated and the maintenance personnel are alerted.

V MAKING CHARGE RECORDS

Customer billing number circuit CBC is actuated each time a subtract signal is received at circuit TGS for accessing circuit AMA to make a separate call record. The record contains the average holding time of calls on group A at that moment and a customer billing number. The latter identifies the customer having exclusive access via segregated connections to group A for billing purposes.

Specifically, with reference to FIG. 4, the subtract bus is connected to circuit CBC so that each negative pulse on lead P generated by markers MO—M*n* circuit CBC in addition to the circuit TGS counter. Circuit CBC contains conventional control circuitry like that of sender OS which is activated by the subtract signal to request a connection to recorder 2 of circuit AMA. The latter responds when recorder 2 is available to serve this request and circuit CBC is connected via transverter connector 6 and transverter 1 to recorder 2 in a conventional manner.

After the recorder connection is established, circuit CBC sends a signal to traffic usage rate indicator TUR which, in turn, returns to circuit CBC the average trunk circuit holding time on group A. That information, together with a prescribed equipment number for the customer stored in circuit CBC, is sent over the transverter connection and recorded on tape in recorder 2. Subsequently, the transverter connection is released and the equipment is available to make additional records as required.

Although not disclosed in detail in the present illustrative embodiment, numerous applications of the principles of the disclosed invention are deemed apparent in the light of this teaching such as, for example, furnishing a plurality of trunk group sample circuits for controlling the making of call records on a plurality of trunk groups as well as increasing or decreasing the number of counter stages to raise or lower the sampling rate of a particular sample circuit. Further, it is considered apparent in view of this teaching to provide apparatus embodying the principles of this invention in other types of offices. Beyond these few examples, numerous other arrangements may also be devised by those skilled in the art without departing from the spirit and scope of the invention.

We claim:

1. Communication equipment comprising:
means for recording call data;
a trunk ground including a plurality of trunk circuits, only a prescribed one of said circuits being connectable to said recording means; and
means activated subsequent to the establishment of a plurality of calls over selectable ones of said circuits for controlling the connection of the prescribed one of said circuits to said recording means to make a record of data for said calls.

2. The equipment of claim 1 further comprising:
means responsive to said plurality of calls over said selectable ones of said trunk circuits for deriving data pertaining to the holding time of said last-mentioned trunk circuits; and
means cooperating with said deriving means for effecting the recording of said derived data by said activated recording means.

3. The equipment of claim 1 further including:
means for counting said calls; and
wherein said counting means actuates said controlling means to make said record after a predetermined number of said calls are counted and after said prescribed one of said trunk circuits is used for serving one of said calls.

4. The equipment of claim 3 further including:
means for sending a signal to said counting means for indicating that said call record is made;
wherein said counting means includes means for storing the accumulated total of said calls; and said counting means is responsive to the receipt of said signal for subtracting a fixed number from said total of calls stored in said storing means.

5. Equipment in a communication switching office for recording call data pertaining to calls made on a trunk group comprising:
a plurality of trunk circuits in said group;
recording means connectable to at least one but less than all of prescribed ones of said circuits for making call records;
means for counting the number of calls established on all of said circuits; and
means actuated by said counting means after a predetermined number of calls are counted and during a subsequent call established on a prescribed one of said circuits for controlling the connection of said last-mentioned prescribed one of said circuits to said recording means for making a call record 6. The invention claimed in claim 5 further including means for sending subtract and add signals to said counting means on each call over said circuits for indicating respectively whether or not said call record is made, and wherein said counting means is incremented upon the receipt of each of said add signals and is decremented on the receipt of each of said subtract signals.

7. The invention set forth in claim 6 further including:
means for determining usage rate data on all of said circuits; and
means actuated by said subtract signal for sending said rate data to said recording means to be recorded.

8. Equipment for recording trunk usages on a dedicated customer trunk group comprising:
a plurality of trunk circuits in said group;
means connected to each of said circuits for continuously indicating the average holding time of said circuits for calls thereover; and
means actuated each time a predetermined plurality of calls on said group are established for making a single record of said average holding time.

9. The equipment recited in claim 8 also including means for generating a prescribed number identifying said customer, and wherein said record making means is controlled after said predetermined plurality of calls by said generating means for recording said identifying number with said holding time.

10. A system for recording data pertaining to calls established over a customer dedicated trunk group comprising:
means for recording call data;
a plurality of trunk circuits in said group, a prescribed one of said circuits being connectable to said recording means;
means connected to said circuits for determining the average holding time of said circuits for calls thereon;
means for counting calls over said circuits and for indicating a predetermined count;
means actuated when said predetermined count is indicated for controlling the connection of a selected one of said prescribed circuits to said recording means;
means subsequently activated for establishing a separate access path to said recording means; and
means thereafter actuated for sending over said path said average call holding time for recording in said recording means.

11. The invention of claim 10 further including:
means for generating a signal indicative of a connection between the selected one of said circuits and said recording means; and
wherein said establishing means is responsive to said signal for establishing said separate access path.

12. The invention recited in claim 10 also including:
means for generating a customer billing number; and
wherein said generating means cooperates with said establishing means for conveying said number over said access path for recording by said recording means.

13. In a communication switching office:
a plurality of trunk circuits;
means responsive to calls to a called destination for establishing call connections on randomly selected ones of said circuits;
means for counting the number of said connections;
means actuated after a predetermined number are counted for generating a signal which indicates the need for a call data record;
means for recording call data being connectable to prescribed ones but not all of said circuits;
means actuated by said signal on a subsequent call connection established on one of said prescribed circuits for connecting said one circuit to said recording means; and
means thereafter actuated for sending call data pertaining to all of said circuits via said one circuit to said recording means.

14. The invention recited in claim 13 also including means for generating a sample mark, and wherein said mark is sent with said data for indicating that said data is obtained by sampling calls on said trunk circuits.

15. A system for recording call data pertaining to calls established over a trunk group comprising:
a plurality of trunks in said group;
a switching network;
means responsive to calls for controlling the establishment of connections to said circuits via said network;
means generating an add signal during the establishment of each one of said connections;
means for counting said add signals and for indicating a total count;
means actuated by said counting means when said total count exceeds a predetermined number for generating a record signal;
means connectable to prescribed ones of said circuits but less than all for recording call data;
means for monitoring all subsequently established calls on said circuits to indicate the establishment of the next connection on one of said prescribed circuits;
means activated both by said record signal and by an indication from said monitoring means for controlling the connection of said one of said prescribed circuits to said recording means;
means actuated thereafter for sending call data over said connection for recording by said recording means;
means subsequently activated for transmitting a subtract signal to said counting means which subtracts a fixed number from said total count;
means connected to said circuits for indicating an average holding time of calls thereover;
means actuated by said subtract signal for establishing a separate access path to said recording means; and
means thereafter energized for sending said holding time to said recording means for recording on a separate call record.

16. Equipment for use in a communication switching system having:
means for recording call data;
a plurality of trunk circuits dedicated to serve one customer exclusively, only one of said trunk circuits having access to said recording means for recording data for all calls served by said circuits;
comprising the invention of means determining the number of calls served over said circuits; and
means activated by said determining means upon the serving of a predetermined number of calls by said circuits and only upon the serving of a call by said one of said circuits having access for controlling said recording means to record data for each of said calls.

17. The invention set forth in claim 16 further comprising:
means for deriving the average holding time of said trunk circuits on said calls; and
wherein said controlling means is effective for controlling the recording by said recording means of the derived average holding time of said trunk circuits on said calls.

18. The invention set forth in claim 17 further comprising:
means activated by said determining means for generating a number identifying said one customer; and
wherein said activated controlling means is effective for controlling the recording of the generated identifying number by said recording means upon said recording of data for each of said calls.

19. The invention set forth in claim 16 wherein said controlling means includes means cooperating with said determining means for controlling consecutive recordings of data pertaining to the average holding time of said circuits, wherein each of said recordings is indicative of the establishment of a predetermined number of calls over said circuits.

20. The invention set forth in claim 19 further comprising:
means activated by said determining means for generating a number identifying said one customer; and
wherein said activated controlling means is effective for controlling the recording of the generated identifying number by said recording means upon said recording of data for each of said calls.

21. The invention set forth in claim 20 wherein:
said determining means includes a counter circuit responsive to the serving of each of said calls over said trunk circuits for counting the number of said calls; and
said counter circuit being responsive to the counting of said predetermined number for selectively activating said controlling means to control said recording means to make said recordings.

22. The invention set forth in claim 21 wherein said counter circuit is selectively activated under control of said controlling means to continue counting beyond said predetermined number until said one of said trunk circuits having access to said recording means is engaged on a call.

23. The invention set forth in claim 22 wherein said counter circuit is selectively recycled under control of said controlling means to begin again to count toward said predetermined number after both a counting to said predetermined number and a serving of a call over said one of said trunk circuits having access to said recording means.